United States Patent [19]

Terashita

[11] Patent Number: 4,710,019
[45] Date of Patent: Dec. 1, 1987

[54] PHOTOGRAPHIC PRINTER AND METHOD FOR DETERMINING EXPOSURE AMOUNT THEREOF

[75] Inventor: Takaaki Terashita, Ashigara-Kamigun, Japan

[73] Assignee: Fuji Photo Film Co., Ltd., Minami-ashigara, Japan

[21] Appl. No.: 944,055

[22] Filed: Dec. 9, 1986

Related U.S. Application Data

[63] Continuation-in-part of Ser. No. 743,966, Jun. 12, 1985, abandoned.

[30] Foreign Application Priority Data

Jun. 15, 1984 [JP] Japan ............................... 59-123263

[51] Int. Cl.⁴ .............................................. G03B 27/73
[52] U.S. Cl. ......................................... 355/38; 355/68
[58] Field of Search ............................... 355/38, 68, 77

[56] References Cited

U.S. PATENT DOCUMENTS

| | | | |
|---|---|---|---|
| 3,947,110 | 3/1976 | Yamada | 355/38 |
| 4,080,066 | 3/1978 | Betzold et al. | 355/28 X |
| 4,099,862 | 7/1978 | Bickl et al. | 355/38 X |
| 4,168,120 | 9/1979 | Freier et al. | 355/38 |
| 4,235,551 | 11/1980 | Harvey | 355/38 |
| 4,299,479 | 11/1981 | Harvey et al. | 355/38 |
| 4,339,517 | 7/1982 | Akimoto | 355/38 X |
| 4,589,766 | 5/1986 | Fürsich et al. | 355/38 |

Primary Examiner—L. T. Hix
Assistant Examiner—D. Rutledge
Attorney, Agent, or Firm—Wenderoth, Lind & Ponack

[57] ABSTRACT

In a method and apparatus for determining a printing exposure amount in a photographic printing system, a characteristic value of a negative film to be printed is first obtained and an exposure amount necessary for printing the negative film is calculated from the characteristic value thereof. Information regarding a density key of the negative film is inputted in accordance with the visual discrimination of the negative film. The device for controlling the determination of the exposure amount on the basis of the density key information includes a unit for correcting the exposure amount in accordance with the density key information and a unit for classifying the inputted density key information and selecting exposure operation formulas based on the classification of the density key information so as to thereby determine a printing exposure amount. The selection of one of the abovenoted two units is done by a selecting switch as occasion demands.

19 Claims, 11 Drawing Figures

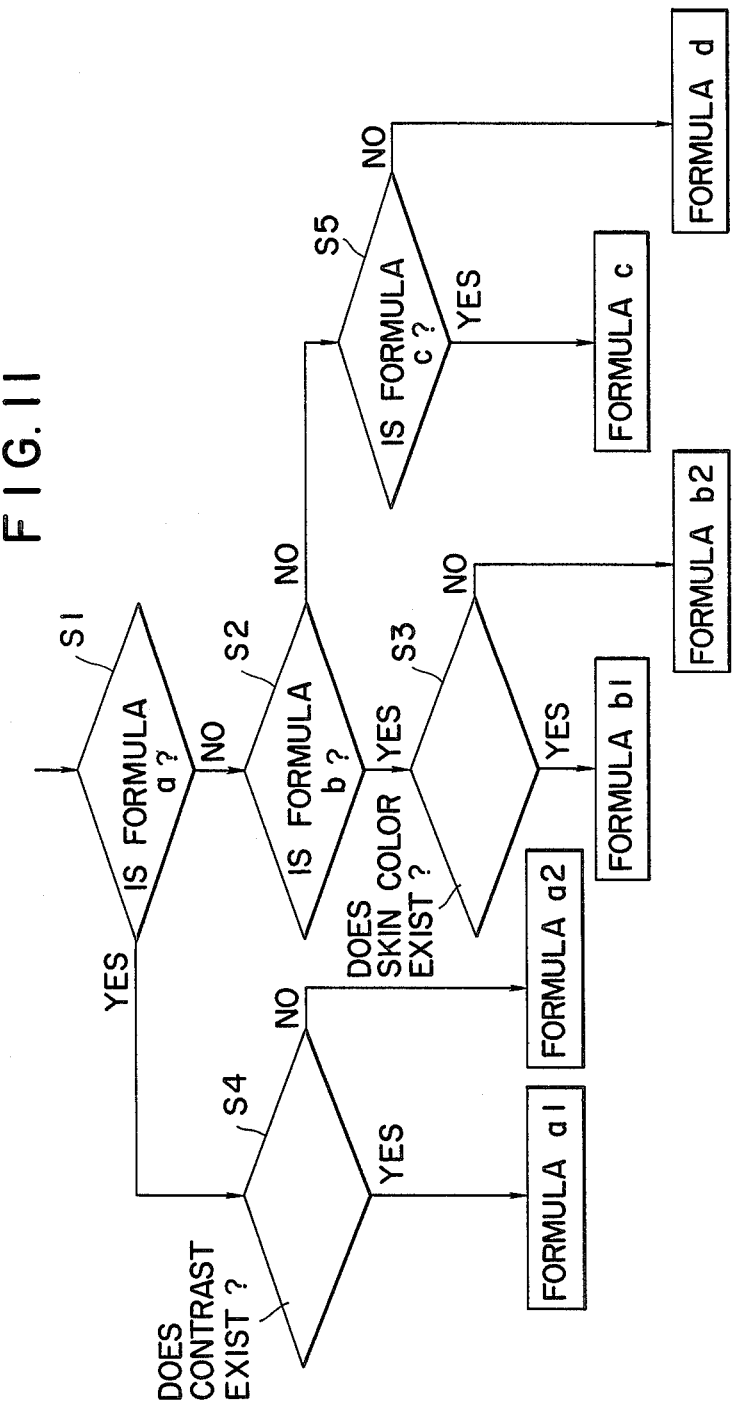

PHOTOGRAPHIC PRINTER AND METHOD FOR DETERMINING EXPOSURE AMOUNT THEREOF

CROSS-REFERENCE TO RELATED APPLICATIONS

This application is a continuation in part of prior application Ser. No. 743,966, filed June 12, 1985, (now aband) entitled "PHOTOGRAPHIC PRINTER AND METHOD FOR DETERMINING EXPOSURE AMOUNT THEREOF", and now abanonded.

BACKGROUND OF THE INVENTION

This invention relates to a photographic printer and a method for determining an exposure amount in a photographic printing process.

The exposure amount in a color film printing operation is generally determined by a large area transmittance density (LATD). However, the determination of the exposure amount by this method actually provides satisfaction only to the extent of 70% of all prints, accordingly, an operator observes a negative film at a pre-stage (i.e. before the exposure at a preliminary inspection device or an exposure opening surface of a printer) of the LATD light measurement and determines a corrected or amended exposure with respect to an LATD exposure in relation to a subject matter to the photographed and a background thereof and a pattern based on his experience usually by a density key, color key, function key, color correction key or the like. The actual exposure is then determined by adding the exposure amount for the LATD and the corrected exposure amount. FIG. 1 shows one example representing the relationship between the correction key according to a classification and the exposure amount corresponding thereto. However, the determining method of this prior art type requires an operator who has a long experience and has trained for several years as an expert in this art field. In addition, in this manual method, individual ability or fatigue of the operator significantly affects the quality of a printed material, as well as the working time and the working conditions. Moreover, the experience of the operator obtained by long training is easily lost by his change of job or retirement.

Taking the above defects of the prior method into consideration, there has been proposed a method for automatically determining the exposure amount by analysis of data of a density value obtained by dividing a picture surface of a film into a plurality of small picture elements and photoelectrically scanning them. However, by this fully automatic correction, products with a satisfactory quality could not also be obtained with respect to the whole printed material. Japanese Laid-open Patent (KOKAI) No. 150336/1976 discloses a method in which density failure and excess and deficiency of the exposure are determined, and classified information regarding thereto are stored by hardware, and in this method, the exposure amount is determined by obtaining the lowest density of the shawdow portion of the film when the average density thereof is high and the highest density of the high-lighted portion of the film when the average density thereof is low. In other words, by designating the density failure by a visual determination, the exposure amount is determined with the lowest density for the reason that a subject matter may reside in the shadow portion when the average density of the film is high. However, it cannot necessarily be said that the subject matter always resides in the shawdow portion when the average density is high, and accordingly, even when the subject matter resides in the shawdow portion, the determination of the exposure amount with the lowest density may lead to an erroneous determination. For this reason, it will be pointed out that the lowest density is often equal to a fog density of the picture, which has a lower value relative to the subject matter. Furthermore, Japanese Laid-open Patent (KOKAI) No. 62428/1977 discloses an inspection device in which a circuit is switched by depressing a button so that a film picture can be positioned in a positive position by rotating an inverted position and a vertical position of the film picture by 90° or 180° in accordance with the visual determination. However, in this method, the characteristic ratio or amount is not obtained in relation to the subject matter and the film picture is merely rotated to bring the film picture into the correct position.

Furthermore, a well known technique for visually determining a density amount to be corrected in a preestimate based on scanning data and correcting a result of an automatic determination is disclosed, for example, in Japanese Laid-open Patent (KOKAI) Nos. 98821/1973 and No. 62429/1977. However, this prior art technique includes defects such as two troublesome determinations are required, one being a determination of the propriety of the correction itself and the other being a determination of the correction amount and an expert is required for these determinations, which adversely affects the ratio of obtaining acceptable prints and processing abilities. Particularly, it is very difficult to accurately estimate the result of the operation of the complicated automatic detemination. In the improvement of the correction amount determination, it is easy to visually discriminate between information regarding kinds of scenes (for example, stroboscopic open scenes, snow scenes or the like) which is difficult in automatic discrimination and to correct the result of the automatic discrimination with the constant amount predetermined in accordance with the kinds of the scenes. However, in the automatic discrimination, although stroboscopic negative films are generally liable to become density deficient, since a plurality of normal or dense stroboscopic negative films exist, there may cause a case where an excessive correction will be performed. Moreover, with respect to the information regarding the scene of the kind described above, a difference between individuals likely occurs for the definition of the scene and it is necessary to image a plurality of scenes. These facts are also defects in this prior art technique. Furthermore, it will be necessary to recognize that stroboscopic scenes are to be of the different kinds or types, respectively, in cases where the background is a white wall, furniture or darkness, or a case of closeup photography. This results from the fact the stroboscopic scenes of this type include no information regarding the subject matter.

According to the visual observations and the determinations of the discrepancy of the most suitable correction exposure amount or rate by a plurality of experts and non-experts, the determinations include considerable differences between individuals, even experts, with respect to picture patterns or the like. For example, as shown in FIG. 2, the results of the determinations of about 98% of the experts have the dispersion rate within ±50% with respect to the most suitable correction exposure rate (0%), while the dispersion rate due to the non-experts is about ±70%. In FIG. 2, characteristic curves I and II are based on the experts and non-experts, respectively, with respect to the determinations requiring increasing correction of the exposure amount with respect to the LATD exposure. Although the correction amounts obtained by the experts and non-experts tend to become small with respect to the optimal correction exposure amount, the correction amounts obtained by the non-experts are less than those of the experts and the FIG. 2 also shows that the tendency of the dispersion is more significant in the increasing of the correction exposure amount than in the decreasing thereof.

As described hereinbefore, the conventional automatic discrimination method according to the input of the information regarding the visual determination is premised on an assumption of the automatic discrimination by an automatic discriminating unit, and only in an inconvenient case, a correction exposure amount of the automatic discrimination is additionally inputted, thus the application of this method being itself limited. In addition, since the visual determination information is represented by the pattern of a negative film and includes substantially no or little information regarding the density of the main part of the negative film, only a small effect of the visual determination information is attained and thus a smaller improvement of the prints is obtained. Accordingly, it will be stated at present that the fully-automatic discrimination and the auxiliaries of the fully-automatic discrimination and visual determination information will lead to the prompt preparation of a print having a high quality with low cost. Furthermore, in small photographic laboratories, it is important to select a method capable of preparing prints, at a constant rate, with a high quality and a high ratio of obtaining acceptable products (called an acceptable ratio hereinafter) even if the working or operation is done with a slow pace by non-experts, and it is thus required to propose a novel printing system which utilizes combined manual and mechanical operations. In another aspect, with a scene in which a spotlight in projected on a small man in front of a shrine or a temple, for example, it will be necessary to provide a characteristic for finely determining the exposure by the correction of the density key.

SUMMARY OF THE INVENTION

An object of this invention is to eliminate defects or disadvantages and improve the prior art technique, and to provide an improved method and system for determining an exposure amount in a photograph printing technique so as to thereby obtain printed products with a high acceptable ratio and high quality in accordance with an automatic discrimination even by non-experts or beginners.

Another object of this invention is to provide a photographic printer that experts in this art field reduce the labor fatigue in the visual determination and that the processing abilities of the operators are improved.

According to this invention, in one aspect, there is provided a method for determining a printing exposure amount in a photograph printing tehnique comprising the steps of obtaining a characteristic value of a negative film to be printed, calculating an exposure amount necessary for printing the negative film from the obtained characteristic value, inputting information regarding a density key used for correcting the calculated exposure amount on the basis of a visual determination of the negative film, selecting and indicating either the case of normal correction in which the density key information is utilized as is for the correction of the exposure amount or the case or classification correction in which the density key information is classified and the printing exposure amount is obtained by selecting preliminarily prepared exposure operation formulas, and executing either the steps of correcting the exposure amount by converting the density key information to a correction amount in a case where the normal correction is indicated or selecting one of exposure operation formulas in accordance with the classification in a case where the classification correction is indicated so as to thereby determine the printing exposure amount in accordance with the selected operation formula.

In another aspect of this invention, there is also provided a photographic printer provided with a construction for determining an exposure amount comprising a unit for obtaining data regarding characteristic value of a negative film to be printed and obtaining an exposure amount calculated by the detected characteristic value, a unit for inputting information regarding a density key in accordance with a visual determination of the negative film, a device for controlling determination of the exposure amount in accordance with the density key information, the controlling device including a unit for correcting the exposure amount in accordance with the density key information and a unit for classifying the inputted density key information and selecting exposure operation formulas based on the classification of the density key information so as to thereby determine a printing exposure amount, and a unit for selecting either the exposure amount correcting unit or the density key information classifying unit.

The nature, principle and utility of the invention will become more apparent from the following detailed description when read in conjunction with the accompanying drawings.

BRIEF DESCRIPTION OF THE DRAWINGS

In the accompanying drawings:

FIG. 11 is a flow chart for executing an embodiment of this invention in accordance with the operational principle shown in FIGS. 5 and 6.

DESCRIPTION OF THE PREFERRED EMBODIMENTS

Figure 1:
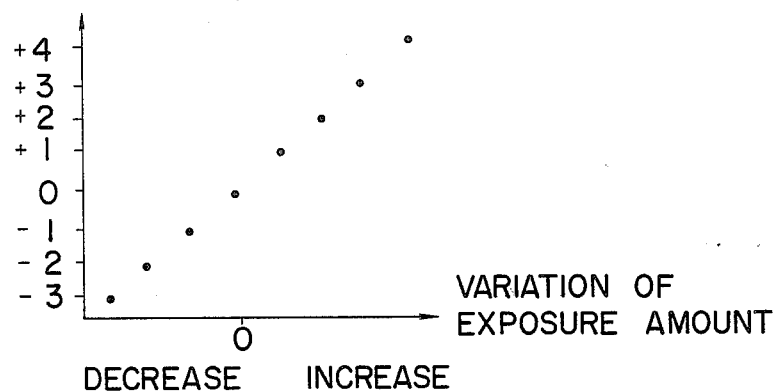
FIG. 1 shows a graph used for explaining a method in a prior art technique for determining a printing exposure amount.
Figure 2:
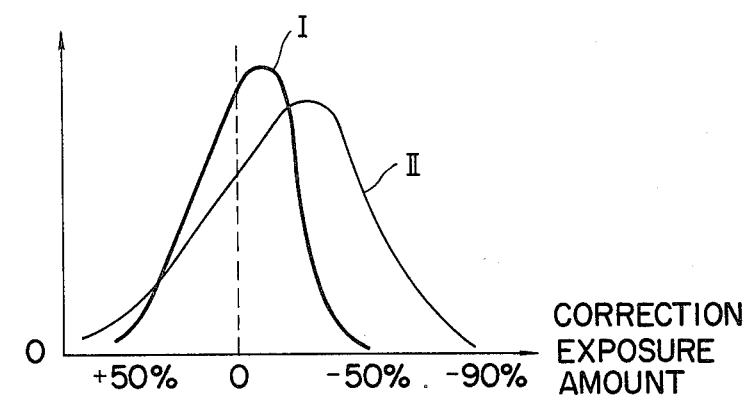
FIG. 2 shows a graph used for explaining differences in exposure correction amounts determined by experts and non-experts using a conventional method.
Figure 3:
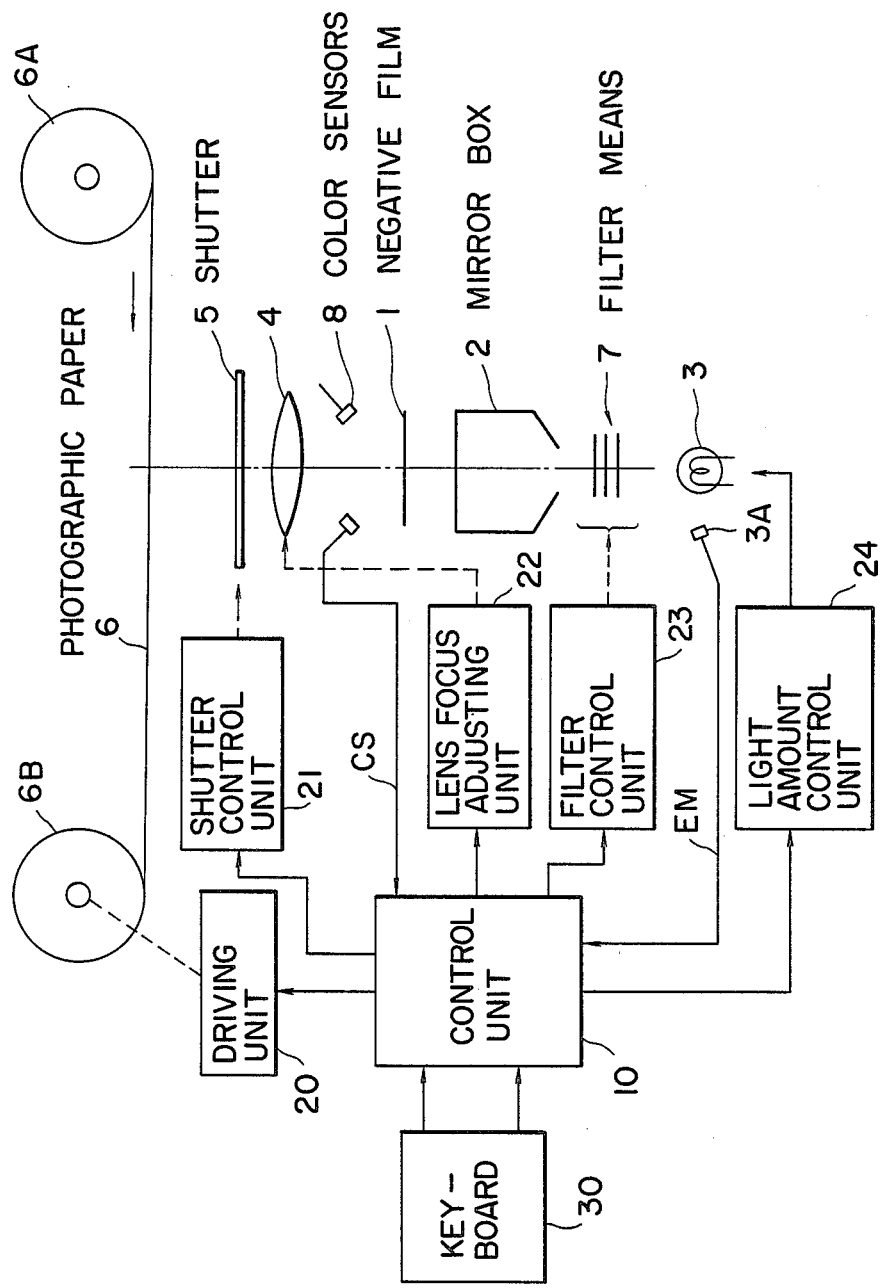
FIG. 3 shows a block diagram of a photographic printer according to this invention.

FIG. 3 shows a constructional diagram of a photograph printing system according to this invention, in which a negative film 1 disposed in a predetermined printing portion is irradiated by light from a light source 3 through a mirror box 2 and the light transmitted through the negative film 1 is focused on a photographic paper 6 through a lens unit 4 and a shutter 5. A filter means 7 for color compensation is arranged between the mirror box 2 and the light source 3 and the light amount from the light source 3 is detected by a photosensor 3A. Characteristic values representing the LATD, the highest density and the lowest density of the negative film 1 are respectively detected by the scanning operation of three color sensors (Red, Green, Blue) 8 arranged at circumferential portions of the lens unit 4 and a signal EM representing the light amount and the measured light data CS are respectively inputted into a control unit 10.

Figure 4:
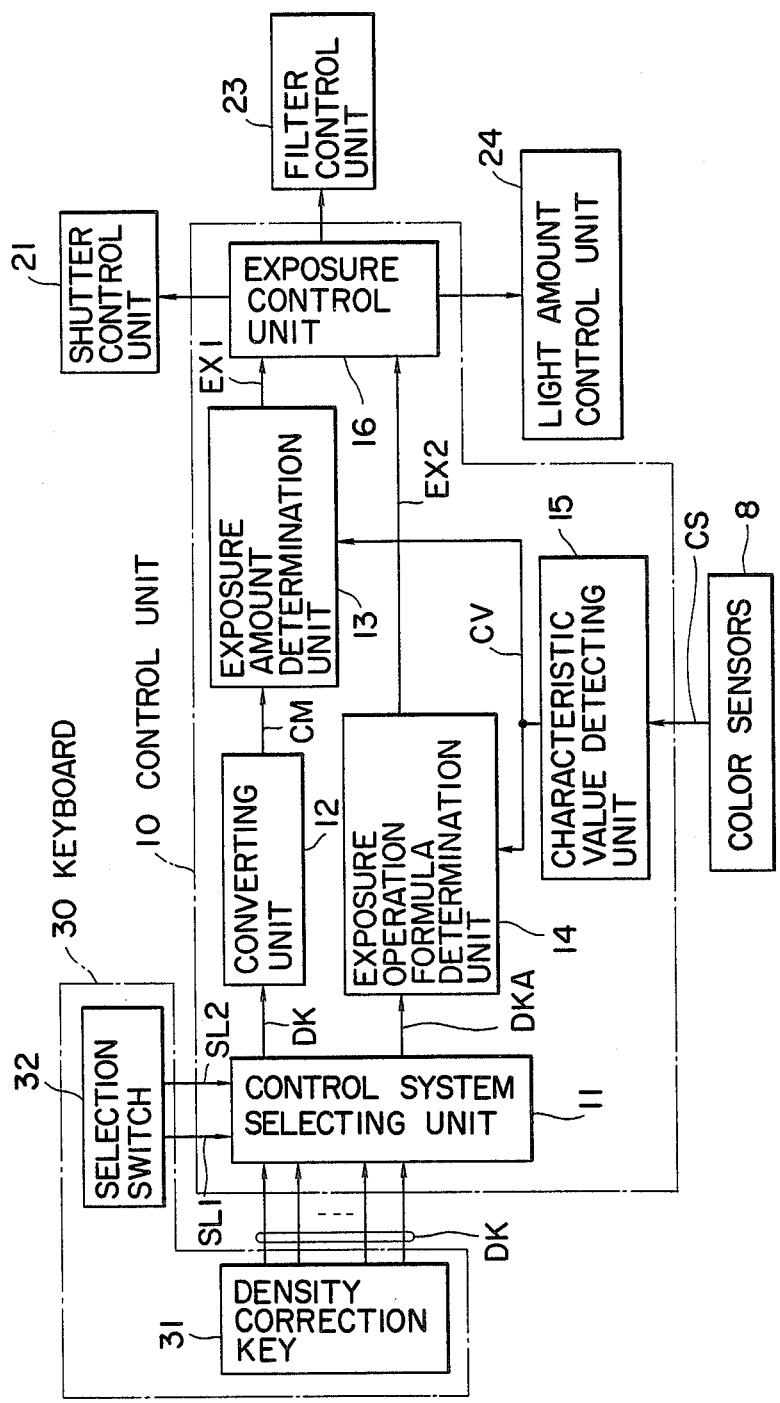
FIG. 4 is also a block diagram showing construction for determining a printing exposure amount of the photographic printer shown in FIG. 3.
Figure 5:
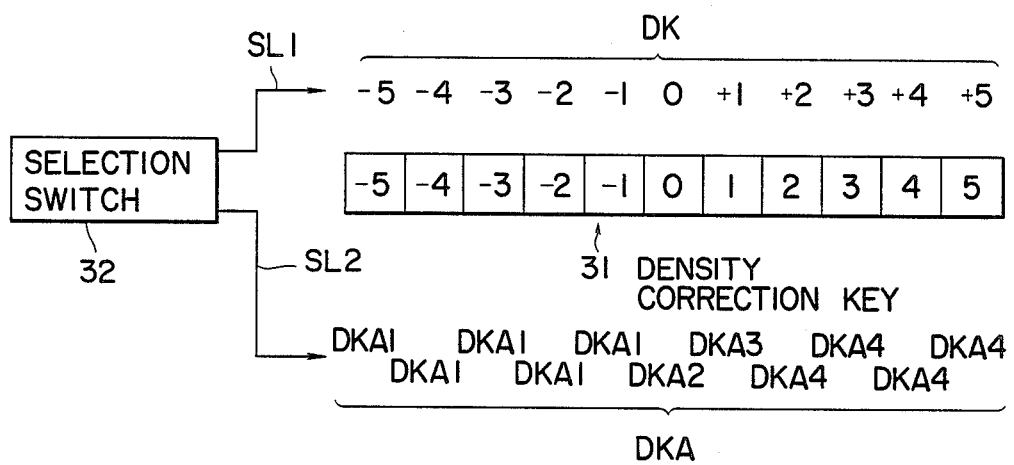
FIG. 5 is a view showing the relationship between the density correction key and the selection switch in FIG. 4.

The photographic paper 6 is wound up around a supply reel 6A and the printed paper is wound up around a take-up reel 6B through a driving unit 20. A shutter control unit 21 controls the shutter 5 to control the exposure at the shutter 5. The focus of the lens unit 4 is adjusted by a lens focus adjusting unit 22 to correctly focus the image. The filter means 7 and the light source 3 ae controlled respectively by a filter control unit 23 and a light amount control unit 24, and these control units 20 through 24 are totally controlled or managed by the control unit 10. To the control unit 10 is operatively connected a keyboard 30, to which, as shown in FIG. 4, also are connected a density correction key 31 to be operated for adjusting a printed density in accordance with a visual determination of the negative film 1 and a selection switch 32 for selecting either a normal correction or a classification correction described hereinafter. FIG. 4 also shows a construction of a portion relative to the exposure control section of the control unit 10. Density key information DK (for example, "−5", "−4", ... "−1", "0", "+1", ... "+5") from the density correction key 31 and selection signals SL1 and SL2 from the selection switch 32 are inputted into a control system selecting unit 11. Measured or sensed light data CS from the color sensors 8 is inputted into a characteristic value detecting unit 15 and the thus detected characteristic value CV is then inputted into an exposure amount determination unit 13 and an exposure operation formula determination unit 14. When the normal correction is selected by a selecting signal SL1 from the selection switch 32 as shown in FIG. 5, the density key information DK ("−5" to "+5") corresponding to the density correction key 31 is inputted as is into the control system selecting unit 11 and is then inputted into a converting unit 12. The correction amount CM converted in the converting unit 12 is inputted into the exposure amount determination unit 13 together with the characteristic value CV and the determined exposure amount EX1 is then inputted into the exposure control unit 16.

When the classification correction is selected by a selecting signal SL2 from the selection switch 32, the inputted density key information DK is respectively converted into classified information DKA (DKA1 to DKS4) as shown in FIG. 5, which is then inputted into the exposure operation formula determination unit 14, in which the exposure amount EX2 is operated together with the characteristic value CV by selectively using a preliminarily prepared plurality of exposure operation formulas and the operated result is then inputted into the exposure control unit 16. The exposure control unit 16 operates so as to control the light amount control unit 24 and/or the shutter control unit 21 in accordance with the inputted exposure amount EX1 or EX2 so as to thereby control the light amount to be projected from the light source 3, the shutter time of the shutter 5, and the opening degree of the filter means 7 for color compensation. The selection switch 32 can be handled manually or automatically so as to output the selecting signal SL1 or SL2. The density correction key 31 can be inputted by an information read out device utilizing a correction key information recording medium such as paper tape, magnetic tape or the like instead of by the keyboard 30. In this case, system selection information is recorded as anin put leading end information of the paper tape, for example.

According to the construction of the system described hereinabove, the operation in a case where the normal density correction is selected by the selection switch 32 will now be described hereunder. In this case, the selecting signal SL1 is inputted into the control system selecting unit 11.

The measured light data CS obtained by the scanning of the color sensors 8 is inputted into the characteristic value detecting unit 15, in which the necessary exposure amount is determined and the characteristic value CV required for the correction of the exposure amount is calculated for and the thus obtained exposure amount and the characteristic value are inputted into the exposure amount determination unit 13 and the exposure operation formula determination unit 14, respectively. Then, the operator makes a visual determination of the negative film 1 and the proper density correction key information DK ("−5" to "+5") is inputted by the density correction key 31 provided with an optional plurality of ranks (in this embodiment, eleven ranks) as exposure information for correction with respect to the basic exposure formula (usually prescribed by the LATD). The inputted density key information DK passes, as is, through the control system selecting unit 11 and is then inputted into the converting unit 12, in which the information DK is converted into the correction amount CM in accordance with a following conversion formula.

$$CM = K^{DK} \qquad (1)$$

As stated before, the density key information DK takes a value between "−5"∼"0"∼"+5", in which a positive value represents a case where the exposure amount increases and a negative value represents a case where the exposure amount decreases. The value "0" represents a case of a standard negative film being utilized in which the density of the subject matter of the film is substantially identical to that of the background thereof. In the above formula (1), a letter K designates a constant representing a degree of the exposure amount variation, and for example, in case of a variation of 20%, the constant K is set to "1.20". The correction exposure amount CM based on the formula (1) obtained in the converting unit 12 is inputted into the exposure amount determination unit 13 and the final exposure amount EX1 determined by the multiplication formula $$EX1 = EF \cdot CM \qquad (2)$$

where EF designates a basic amount calculated in accordance with the characteristic value CV (for example, LATD). The thus obtained exposure amount EX1 is inputted into the exposure control unit 16 and the negative film 1 is printed under the control of the light source 3, the shutter 5 and/or the filter means 7.

The operation in a case where the classification correction is selected by the selection switch 32 will now be described. In this case, the selecting signal SL2 is inputted into the control system selecting unit 11.

In this case, as described before in the case of the normal correction, the negative film 1 is first divided into a plurality of small portions, which are then scanned to obtain the characteristic value CV, and the density correction key 31 is operated for classifying the negative film 1 by the visual determination of an operator. In this operation, the density key information DK inputted in a time of the normal exposure correction is utilized as the classification signal DKA (DKA1 to DKA4) as shown in FIG. 5. That is, the density key information DK inputted for the density correction is utilized as is for the classification of the negative film 1. The classification of the negative film 1 is performed inclusively of the characteristic value GV obtained by the information of the visual determination or the scanning on the negative film 1, and after the classification, a classification signal DKA (DKA1 to DKA4) transmitted from the control system selecting unit 11 selects an operation formula preliminary set in the exposure operation formula determination unit 14 for determining the exposure amount, the exposure amount thus being determined by the selected operation formula with the characteristic value CV. With the classification of the negative film 1, in order to carry out the high speed treatment with a high acceptable ratio by non-experts, it is desired to classify into several classifications which number below six, and preferably number below four, with the variation rate of the exposure amount over 60%, and preferably over 100%. The operation or calculation in the exposure operation formula determination unit 14 may be performed in accordance with the formulas known from Japanese Laid-open Patent (KOKAI) Nos. 28131/1979 and 23936/1977, for example, in this case, the coefficients of the preliminarily set operation formulas and the characteristic values to be used differ on the basis of the classification signal DKA. That is, the negative film 1 is classified approximately on the basis of the density key information DK by the visual determination and the exposure amount is then precisely and finely operated by the characteristic value CV obtained by the scanning so as to thereby obtain the final exposure amount EX2.

Figure 6:
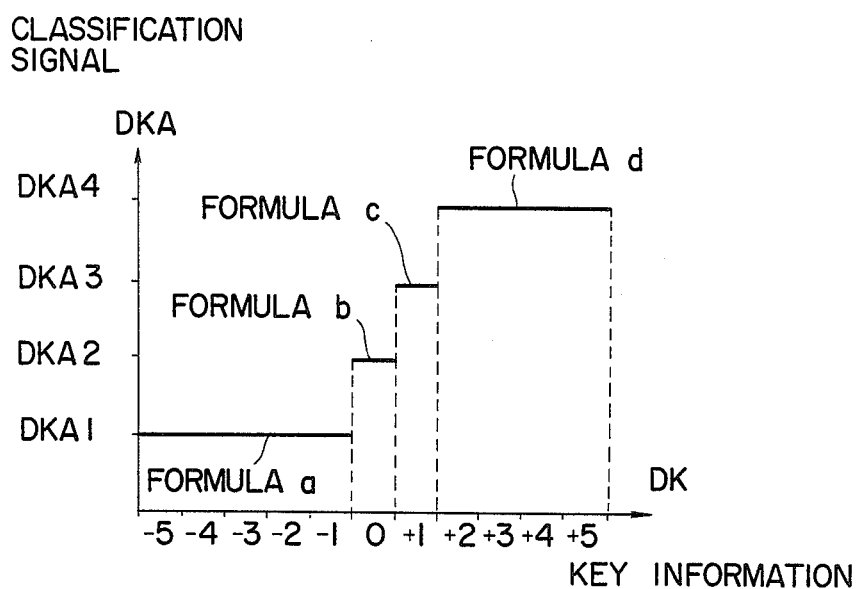
FIG. 6 shows a graph for explaining the operational principle of the method in this invention.

FIG. 6 shows a graph representing the relationship between the classification based on the density key information DK to be inputted in accordance with the visual determination and the selection of the preset operation formulas. Four kinds of operation formulas (a through d) are stored in the operation formula determination unit 14, and the classification signal DKA (DKA1 to DKA4) is transmitted in response to the density key information DK, thus setting the operation formula in the exposure operation formula determination unit 14 with the classification signals DKA1 through DKA4 so as to thereby select the formulas a throgh d, respectively. When the density correction key information obtained by the visual determination with respect to the negative film 1 is "−1", the classification signal DKA1 is transmitted from the control system selecting unit 11 as shown in FIGS. 5 and 6 and the characteristic value CV obtained by the scanning of the negative film 1 is applied to the operation formula a for the exposure amount. The negative film 1 is printed by the thus obtained exposure amount. When the density key information is "−2", for example, the predetermined exposure amount will be decreased from the result of the operation by the formula a. According to the key construction described above, the density correction key 31 is used for inputting the density key information DK and the classification signal DKA by the selection switch 32 through the control system selecting unit 11 and is capable of being mounted to the photographic printer at a narrow space and the most usable position. Since the number of the density correction key 31 corresponds to the amount of the density key information DK and the kind of the classification signal DKA respectively, it is very easy to operate the density correction key 31 and the selection switch 32 and the operation errors scarcely occur.

Figure 7:
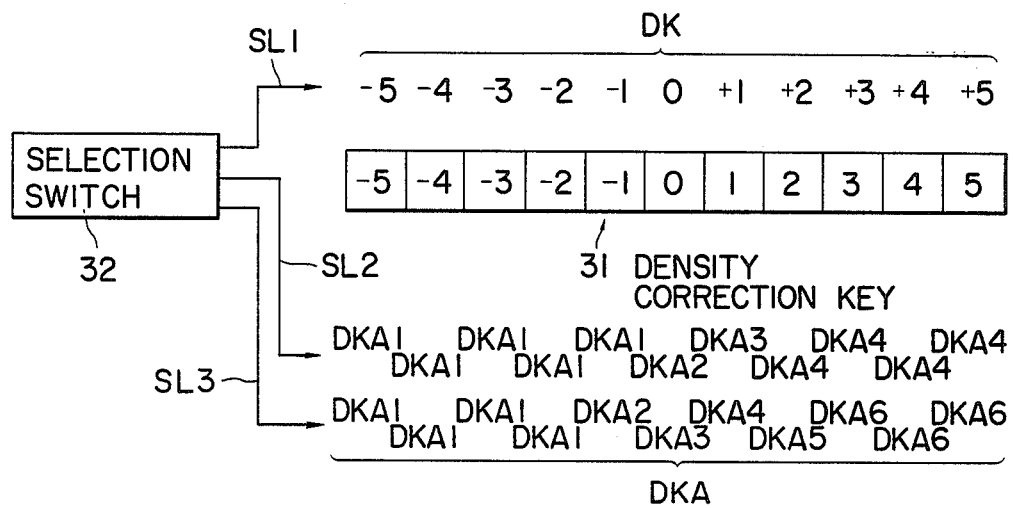
FIGS. 7 through 10 are views showing other embodiments of inputting means for the classification information according to this invention, respectively.
Figure 8:
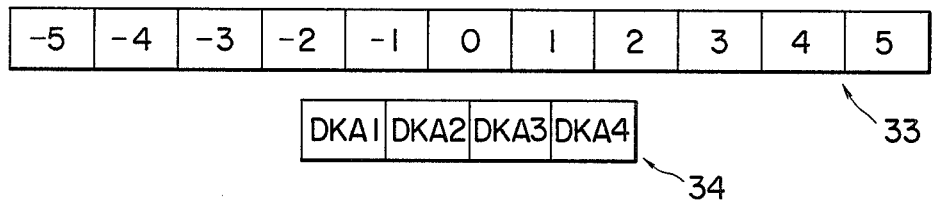
Figure 9:
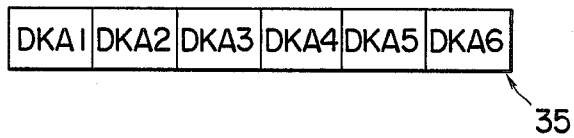
Figure 10:
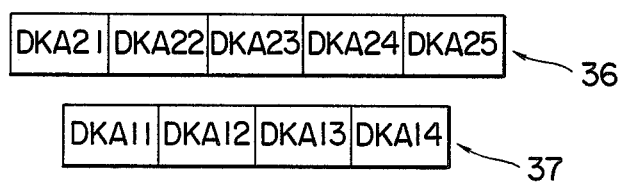

FIGS. 7 through 10 shows other examples of the inputting means for the density correction and the classification of the negative films. In FIG. 7, the selection switch 32 outputs selecting signals SL1 to SL3 and the numbers "−5" to "5" of the density correction key 31 respectively correspond to the classification signals DKA1 to DKA6 when the selecting signal SL3 is outputted. Although the embodiments in FIGS. 5 and 7 described above have the selection switch 32 for selecting the density correction and the classification, the embodiments shown in FIGS. 8 to 10 do not have a selection means and have the exclusive keys respectively. The embodiment shown in FIG. 8 has a density correction key 33 for inputting the density correction information ("−5" to "+5") and a classification key 34 for inputting the classification correction information DKA1 to DKA4. In this case, it is possible to represent the picture on the classification key 34 so as to easily determine the classification and to correct the exposure amount according to the classification key 34 by using the density key 33. The most simple example is shown in FIG. 9, in this case only the classification key 35 is provided and it is necessary to precisely determine the exposure amount. The example shown in FIG. 10 has two classification keys 36 and 37, the classification key 36 is used for normally printing and the key 37 for more precise classification. This input means is suitable for expert to non-expert operators and is especially effective for the classification of the special images such as a night scene, an astronomical scene and a microphotograph.

The acceptable ratio obtained by actually utilizing the method in FIGS. 5 and 6 described above will be described as examples.

|   |   | acceptable ratio |   |
|---|---|---|---|
| (i) | A group of objects to be photographed whose correction amounts are assumed to be: "correction amount ≦ −30%" | 95.1% | →formula a |
| (ii) | A group of objects to be photographed whose correction amounts are assumed | 93.8% | →formula b |

|  | acceptable ratio |  |
| --- | --- | --- |
| (iii) A group of objects to be photographed whose correction amounts of which are assumed to be: "−50% ≦ correction amount ≦ +50%" | | |
| | 90.3% | →formula c |
| (iv) A group of objects to be photographed whose correction amounts are assumed to be: "+30% ≦ correction amount ≦ +130%" | | |
| | 95.7% | →formula d |
| total | 93.8% | |

In a comparison of this method with the convertional visual determination of the non-experts, the acceptable ratio of which is 91.4%, it will be understood that a print with high acceptable ratio and high quality can be obtained by the method according to this invention in comparison with the conventional visual determination method. In addition, since the determination is relatively easily performed, the working efficiency rises and the differences in the individual determinations are eliminated.

In the evaluation of this invention, although if it is assumed that the exposure amount variation ratio could be classified by an interval of 60%, the acceptable ratio of 100% (assuming that the range of the acceptable ratio is within ±30% of the most suitable value) would be theoretically obtained without mathematical operations, the exposure amount to be corrected cannot be determined with the acceptable ratio of 100% but only with the ratio or precision described above even by the experts. The classifications of the narrow variation ratio (interval of 60%, for example) carely leads to the increasing of the acceptable ratio because of the inclusion of the error in the classification and with the non-experts the sufficient ratio may be adversely decreased. Therefore, it will be better to classify the scenes corresponding to the exposure correction area covering the variation ratio of over 60% (preferably, over 100%) into the same classification group and then to obtain a proper correction exposure amount with respect to the LATD by the operation formula or to directly obtain the final exposure amount by the operation formula.

In the foregoing disclosures, although the classification was explained in connection with the correction exposure amount for an easy explanation of this invention, it would be possible to classify the above groups asrespective scenes in such a manner as that the object group (i) is classified as scenes decreasing the exposure amount; the object group (ii) as scenes requiring no correction; the object group (iii) as scenes increasing the correction amount; and the object group (iv) as scenes highly increasing the exposure amount.

As stated hereinbefore, since the correction amount of the exposure amount was determined by the subject matter and the background of an object to be photographed and the determination of this correction amount was utilized as it was for the correction in the prior technique, the determination involved differences between individuals or others. However, according to this invention, the visual determination is utilized only for the classification of the scene, so that prints with high acceptable ratio are obtained without requiring so high an extent of precision. In addition, scenes provided with similar densities of objects to be photographed can be gathered by utilizing classification information corresponding to the exposure correction amount; that is, the decreasing of the correction exposure amount means that the subject portion mainly resides in the shadow portion so as to thereby significantly improve the precision of the operation formula in the automatic discrimination unit. Furthermore, since the characteristic values in case of utilizing the classification of the scanning data in addition to the visual determination information are considered information regarding the contrast, the picture position density (for example, density of the central portion of the picture), the skin, the colors of the picture and the subject (important) or unimportant portion, and the case when the contrast information and the skin information are utilized will be processed as shown in FIG. 11, for example. In FIG. 11, the formula a referred to hereinbefore is classified into formulas a1 and a2 in accordance with the existence of the contrast of the picture to be treated, and the formula b is also classified into formulas b1 and b2 in accordance with the existence of the skin color. At the step S1 in FIG. 11, the selection and the determination of the formula a are executed so as to thereby determine the existance of contrast (Step S4), and when contrast exists, the formula a1 is utilized and when contrast does not exist, the formula a2 is utilized. In the like manner, at the Step S2, the selection and determination of the formula b are executed so as to thereby determine the existence of skin color (Step S3), and when skin color exists, the formual b1 is utilized and when skin color does not exist, the formula b2 is utilized. At the Step 5 the formulas c and d are selected and determined.

In the foregoing description, the density key information DK with respect to the exposure amount due to the basic exposure formula is used as visual determination information, but in this method, the dispersion range of the exposure amount in the discrimination of the expert is within about ±50%, but that of the non-experts expands to about ±70%.

Experimented data showing sufficient cases in which the exposure amount range is within the most suitable amount ±30% with respect to negative films each provided with 2000 frames will be introduced hereunder.

|  | Acceptable Ratio |
| --- | --- |
| Classification A | |
| (a) A group of negative films whose correction amounts are assumed to be: "correction amount ≦ −30%" | 95.1% |
| (b) A group of negative films whose correction amount are assumed to be: "−50% < correction amount ≦ +50%" | 93.8% |
| (c) A group of negative films whose correction amounts are assumed to be: "+30% < correction amount < +130%" | 90.3% |
| (d) A group of negative films | 95.7% |

|  | Acceptable Ratio |
|---|---|
| whose correction amounts are assumed to be: "+110%< correction amount" | |
| Total | 93.8% |
| Classification B | |
| (a) A group of negative films whose correction amounts are assumed to be: "correction amount <0%" | 92.0% |
| (b) A group of negative films whose correction amounts are assumed to be: "−60%< correction amount <+60%" | 91.8% |
| (c) A group of negative films whose correction amounts are assumed to be: "+20%< correction amounts <+140%" | 88.7% |
| (d) A group of negative films whose correction amounts are assumed to be: "+100%< correction amount" | 92.1% |
| Total | 91.5% |
| Classification C | |
| (a) A group of negative films whose correction amounts are assumed to be: "correction amount <0%" | 92.0% |
| (b) A group of negative films whose correction amounts are assumed to be: "−70%< correction amount <+70%" | 89.6% |
| (c) A group of negative films whose correction amounts are assumed to be: "+20%< correction amount <+140%" | 88.7% |
| (d) A group of negative films whose correction amounts are assumed to be: "+100%< correction amount" | 92.1% |
| Total | 89.8% |

The classification A is for the experts and the classifications B and C define the discrimination basis for the beginners with the correction exposure amount. The classification A represents a case in which the definitions of the groups to be inputted and the high discrimination precision between the respective groups are required, the classification B represents a case in which the definitions of the groups to be inputted and the high discrimination precision between the respective groups are lowered, and the classification C represents a case in which the discrimination precision of the requirement for the correction is further lowered for the beginners. Accordingly, in taking into consideration the acceptable ratio of 91.4% in the conventional method by the experts, the prints of high quality more than that in the conventional method can be prepared on the basis of the classification A, and the beginner can obtain a performance nearly that obtained by the expert by utilizing the operation formula within the correction amount range defined by the classification C. The acceptable ratio reaches 95.2% by identifying the correction exposure area with the classification A for the experts and by increasing the number of classifications to 10 ranks. The value 95.2% is nearly 100% in an actual evaluation of the acceptable prints. In this case, the operator can utilize the classifications of 10~15 ranks, which are utilized usually, as they are, so that there is no problem of the degradation of the treating ability and experience of the operator.

Although the classifications A, B and C were referred to with respect to the exposure correction amount for the sake of an easy explanation or understanding, they may be inputted by the density correction key on the basis of the following in an actual operation.

| (1) A group for decreasing the exposure correction amount | backlighted scene, snow scene, low contrast scene or the like |
|---|---|
| (2) A group for no-change in the exposure correction amount | normal scene |
| (3) A group for increasing the exposure correction amount | stroboscopic scene and scene provided with dark background |
| (4) A group for significantly increasing the exposure correction amount | stroboscopic scene with important feature in dark portion, firecracker or the like |

According to this invention, the improved relative relationship of the characteristic value for the operation with respect to the density of the subject matter can be obtained and the precise determination can be made by investigation in detail the density area in which the subject matter exists in accordance with the visual determination information in comparison with the conventional method in which the characteristic value was obtained from the whole picture surface because the subject matter was not assumed in the conventional method. Accordingly, when it is recognized that the important portion of the film exists on the shadow side of the picture, the information on the highlight side is not necessary, so that the characteristic value may be obtained except for that portion. In a case of a portrait on a window side, the highlight is out of the window and when it is determined that the subject matter exists in the shadow side, the contrast is very high, the maximum density is high, and the density of the central portion is high in comparison with that of the circumferential portion. This case resembles the characteristic value in a case where the subject matter exists in the highlight side, so that the sufficiently suitable results of the operation cannot be expected. However, in this invention, since the characteristic value whose density of the subject matter is preliminarly considered is utilized, it is possible to obtain prints with high ratio of acceptable products and high quality.

With the exposure correction according to the classification described hereinbefore, although the operation formula is selected by the classification signal DKA and the final exposure amount EX2 is obtained by the detected characteristic value CV, the correction formula may be selected by the classification signal DKA so as to thereby correct the exposure amount obtained by calculating the exposure formula given by the characteristic value CV. In addition, in the foregoing disclosure, the four kinds of the exposure operation formulas a through d to be preliminarily set are referred to, but the numbers of the formulas are of course optionally set and the selection of the type of the classification signal DKA with respect to the density key information DK to be inputted and the selection of the operation formulas with respect to the classifications can be also optionally changed. Moreover, although the classification signal DKA is transmitted in the basisof the density key information DK from the density correction key 31, the classification can be performed by inputting the density key information regarding the important portion and the background of the negative film. The inventive ideas or techniques of this invention developed hereinabove can be applied to the control of the exposure amount of the red, green and blue colors in the same manner.

As described hereinbefore, according to this invention, since the correction based on the density key carried out conventionally and the correction based on the classification of negative films can be selectively utilized, an operator can select these correction methods in accordance with the actual usage or condition. Moreover, these correction methods can be utilized individually by the same information, thus using the commonly available inputting unit of a printing system.

In addition, the classification numbers of the negative films can be reduced so as to thereby improve the acceptable ratio of the printed products of non-experts or beginners to the extent of that obtained by the experts. Moreover, in a conventional technique, the numbers of the products to be printed by one operator are limited to about 30,000 frames per day, but the operator can print 70,000 or more frames per a day according to this invention, and accordingly, the film exposure determination speed can also be improved by 30~50% in comparison with the conventional method.

It should be understood that many modifications and adaptions of the present invention will become apparent to those skilled in the art and it is intended to encompass such obvious modifications and changes in the scope of the claims appended hereto.

What is claimed is:

1. A method for determining a printing exposure amount in a photographic printer comprising the steps of:
   obtaining a plurality of characteristic values of a negative film to be printed, which represent features of a picture image, by scanning said negative film;
   calculating an exposure amount necessary for printing said negative film due to the obtained characteristic values;
   inputting classification information for correcting the calculated exposure amount on the basis of a visual discrimination of said negative film;
   selecting one of a plurality of previously prepared exposure operation formulas according to said inputted classification information; and
   determining printing exposure amount in accordance with said calculated exposure amount and said selected exposure operation formula using said characteristic values.

2. A method according to claim 1, wherein said characteristic values include a mean density, a maximum density and a minimum density.

3. A method according to claim 2, wherein a characteristic value for determining said exposure amount is at least one of the mean density, the maximum density and the minimum density.

4. A method according to claim 1, wherein said printing exposure amount is determined by adding a value calculated using said the selected exposure operation formula to said calculated exposure amount.

5. A method according to claim 1, further including the step of exposing a photographic paper with said printing exposure amount.

6. A method according to claim 1, wherein said classification information is inputted in accordance with the relationship of a density of subject matter and a density of a background of said negative film to be printed.

7. A method according to claim 6, wherein said classification information is inputted for a negative film wherein said density of said background is higher than said density of said subject matter, and one of said exposure operation formulas which is suitable for said negative film for which a required negative exposure correction is selected.

8. A method according to claim 6, whereins said classification information is inputted for a negative film wherein said density of said background is equal to said density of said subject matter, and one of said exposure operation formulas which is suitable for said negative film for which a required small exposure correction is selected.

9. A method according to claim 6, wherein said classification information is inputted for a negative film wherein said density of said background is lower than said density of said subject matter, and one of said exposure operation formulas which is suitable for said negative film for which a required positive exposure correction is selected.

10. A method for determining a printing exposure amount in a photographic printer comprising the steps of:
    preparing a plurality of exposure operation formulas;
    obtaining a plurality of characteristic values of a negative film to be printed, which represent features of a picture image, by scanning said negative film;
    calculating an exposure amount necessary for printing said negative film by substituting said characteristic values for an exposure determining formula;
    observing density of said negative film for classification;
    inputting classification information according to said observed density;
    selecting one of said exposure operation formulas in accordance with said inputted classification information;
    determining a printing exposure amount by adding a value obtained by said selected exposure operation formula using said characteristic values to said calculated exposure amount.

11. A method according to claim 10, wherein said characteristic values include a mean density, a maximum density and a minimun density.

12. A method according to claim 10, wherein said exposure operation formulas are respectively manually changed in accordance with a degree of skill of an operator performing said observing operation.

13. A method according to claim 10, wherein said inputting of said classification information is performed by manually operating keys.

14. A method according to claim 13, wherein said selection of said exposure operation formulas is automatically performed in accordance with said manual operation of said keys.

15. A photographic printer provided with a means for determining a printing exposure amount comprising:
    a measuring means for measuring a negative film to be printed and for obtaining characteristic values thereof;
    an operator means for obtaining an exposure amount in accordance with said characteristic values;
    an input means for inputting classification information regarding a density in accordance with a visual discrimination of the negative film;
    a memory means for storing a plurality of exposure operation formulas which are respectively correction formulas for correcting the exposure;

a selecting means for selecting one of said exposure operation formulas in accordance with said inputted classification information;

a correction means for correcting the exposure amount in accordance with said selected exposure operation formula using said characteristic values so as to thereby determine a printing exposure amount; and a printing means for exposing a photographic paper using said printing exposure amount.

16. A photographic printer according to claim 15, wherein said input means comprises a density correction key for commanding a normal correction or a classification correction and a selection switch for selecting one of said two correction functions of said density correction key.

17. A photographic printer according to claim 16, wherein said classification correction corresponds to said selection of said exposure operation formulas.

18. A photographic printer according to claim 15, wherein said input means comprises a density correction key for commanding a normal correction, a first or a second classification correction and a selection switch for selecting one of said three correction functions of said density correction key.

19. A photographic printer according to claim 15, wherein said input means comprises keys for selecting one of said exposure operation formulas, each of said keys respectively corresponding to one of said exposure operation formulas.

* * * * *